United States Patent
Price et al.

(10) Patent No.: US 10,726,670 B2
(45) Date of Patent: Jul. 28, 2020

(54) IN-CASINO MOBILE GAMING

(71) Applicant: Caesars Entertainment Operating Company, Inc., Las Vegas, NV (US)

(72) Inventors: Melissa Price, Las Vegas, NV (US); Sadaf Pena, Las Vegas, NV (US)

(73) Assignee: Caesar's Entertainment Operating Company Inc., Las Vegas, NV (US)

( * ) Notice: Subject to any disclaimer, the term of this patent is extended or adjusted under 35 U.S.C. 154(b) by 0 days.

(21) Appl. No.: 16/209,714

(22) Filed: Dec. 4, 2018

(65) Prior Publication Data
US 2019/0122497 A1 Apr. 25, 2019

Related U.S. Application Data

(63) Continuation of application No. 15/521,749, filed as application No. PCT/US2015/057426 on Oct. 26, 2015, now abandoned.
(Continued)

(51) Int. Cl.
*G07F 17/32* (2006.01)
*G06Q 30/06* (2012.01)
(Continued)

(52) U.S. Cl.
CPC ......... *G07F 17/3251* (2013.01); *G06Q 30/06* (2013.01); *G07F 17/3218* (2013.01);
(Continued)

(58) Field of Classification Search
None
See application file for complete search history.

(56) References Cited

U.S. PATENT DOCUMENTS

| 5,429,361 A | 7/1995 | Raven et al. |
| 5,613,912 A | 3/1997 | Slater |

(Continued)

FOREIGN PATENT DOCUMENTS

| JP | 201509031 | 3/2010 |
| JP | 2013186763 A | 9/2013 |

OTHER PUBLICATIONS

ISA/KR, International Search Report issued on PCT Application No. US2015/057426, dated Feb. 2, 2016, three (3) pages.
(Continued)

*Primary Examiner* — Lawrence S Galka
(74) *Attorney, Agent, or Firm* — Greenberg Traurig, LLP

(57) ABSTRACT

Described embodiments enable casino patrons to play casino games with cash wagers using mobile devices while located at the casino. A player funds the game by providing cash or credit at a funding gaming kiosk. A verification code is provided to the customer. The customer enters into a gaming mode on the mobile device, and inputs the verification code into the mobile device. The mobile device uses the verification code to retrieve the funding amount from a casino gaming system and makes it available to the customer for wagering. At the conclusion of the gaming session, the mobile device provides any remaining amount to the casino gaming system, and the customer can retrieve the cash or credit from the gaming kiosk or other funding location. The mobile device may perform a geolocation function to confirm that its current location is at the casino or other authorized location.

5 Claims, 4 Drawing Sheets

Related U.S. Application Data

(60) Provisional application No. 62/068,758, filed on Oct. 26, 2014.

(51) Int. Cl.
*G07F 17/34* (2006.01)
*G06Q 50/34* (2012.01)

(52) U.S. Cl.
CPC ...... *G07F 17/3225* (2013.01); *G07F 17/3239* (2013.01); *G07F 17/3241* (2013.01); *G07F 17/3293* (2013.01); *G07F 17/34* (2013.01); *G06Q 50/34* (2013.01)

(56) References Cited

U.S. PATENT DOCUMENTS

| | | | | |
|---|---|---|---|---|
| 6,394,907 | B1* | 5/2002 | Rowe | G06Q 20/02 273/143 R |
| 2011/0306401 | A1* | 12/2011 | Nguyen | G07F 17/3244 463/20 |
| 2012/0315984 | A1* | 12/2012 | Carrico | G07F 17/329 463/30 |
| 2013/0023339 | A1 | 1/2013 | Davis et al. | |
| 2013/0053133 | A1 | 2/2013 | Schueller | |
| 2013/0090155 | A1* | 4/2013 | Johnson | G06Q 50/34 463/25 |
| 2013/0210517 | A1 | 8/2013 | Agarwal et al. | |
| 2014/0057703 | A1 | 2/2014 | LeStrange et al. | |
| 2014/0094272 | A1 | 4/2014 | Kelly et al. | |
| 2014/0316980 | A1* | 10/2014 | Seyer | G07F 17/3218 705/39 |
| 2015/0228153 | A1* | 8/2015 | Hedrick | G07F 17/3225 463/25 |
| 2015/0243133 | A1* | 8/2015 | Nicholas | G07F 17/3244 463/25 |
| 2015/0325077 | A1* | 11/2015 | Lyons | G07F 17/3227 463/40 |
| 2016/0379443 | A1* | 12/2016 | Abbott | G07F 17/32 463/25 |

OTHER PUBLICATIONS

Office Action for Japanese application No. 2017-540983 dated Aug. 6, 2019, nine (9) pages.

* cited by examiner

IN-CASINO MOBILE GAMING

CROSS REFERENCE TO RELATED APPLICATION

This application is a continuation of U.S. patent application Ser. No. 15/521,749 entitled "In-Casino Mobile Gaming," filed Apr. 25, 2017, which is a National Stage Filing of International Patent Application Serial No. PCT/US15/57426, filed Oct. 26, 2015, that claims the benefit of U.S. Provisional Application 62/068,758, filed on Oct. 26, 2014, each of which are incorporated herein by reference in their entirety.

FIELD OF DISCLOSURE

The described embodiments relate generally to casino gaming. In particular, the described embodiments enable gaming to be conducted on a mobile device with access to funding information provided through a separate device.

BACKGROUND OF RELATED ART

Conventional casino games involve physical devices distributed across the casino floor. To play a game, a customer walks up to a device such as a slot machine, inserts cash or another form of credit to fund the machine, and then plays the game. Players can receive winnings, if any, at the machine, and can also cash out any unplayed portion of the wager amount. This game format requires that some form of automated scanning device, such as a bill reader or stored value ticket or card reader be physically located in the casino gaming device on the casino floor. The purchase and maintenance of a large number of these bill, ticket or card readers, each associated with an individual game device, such as a slot machine, throughout the casino floor adds considerable expense to the casino operations.

SUMMARY

Described embodiments enable casino patrons to play casino games with cash wagers using mobile devices while located at the casino. A player funds the game by providing cash or credit at a funding kiosk or via a customer service representative. A verification code is provided to the customer. For example, in exchange for cash accepted by the kiosk, the kiosk may print out a ticket for the customer that has a unique verification code. The kiosk is in communication with the casino's gaming system, and transmits to the system a value indicative of the amount of credit associated with the verification code. The customer enters into a gaming mode on the mobile device, and inputs the verification code into the mobile device, for example, by using the mouse, keyboard, or touchscreen functions of the mobile device. The mobile device uses the verification code to retrieve the correct funding amount from the casino gaming system and makes that amount available to the customer for wagering. At the conclusion of the gaming session, if any value remains available to the customer, the mobile device provides the amount to the casino gaming system, and the customer can retrieve the cash or credit from the kiosk or other funding location. In various embodiments, the mobile device additionally performs a geolocation function to confirm that its current location is at the casino or other authorized location. In this way, game play can be moved from the casino floor to, for example, a more social and comfortable lounge setting, which some players may prefer.

By decoupling real money game play from large and expensive casino floor-based devices like slot machines, and enabling such gaming to move, for example, to a lounge environment casino operating costs may be decreased and game play enhanced in a more comfortable environment.

DETAILED DESCRIPTION

Figure 1:
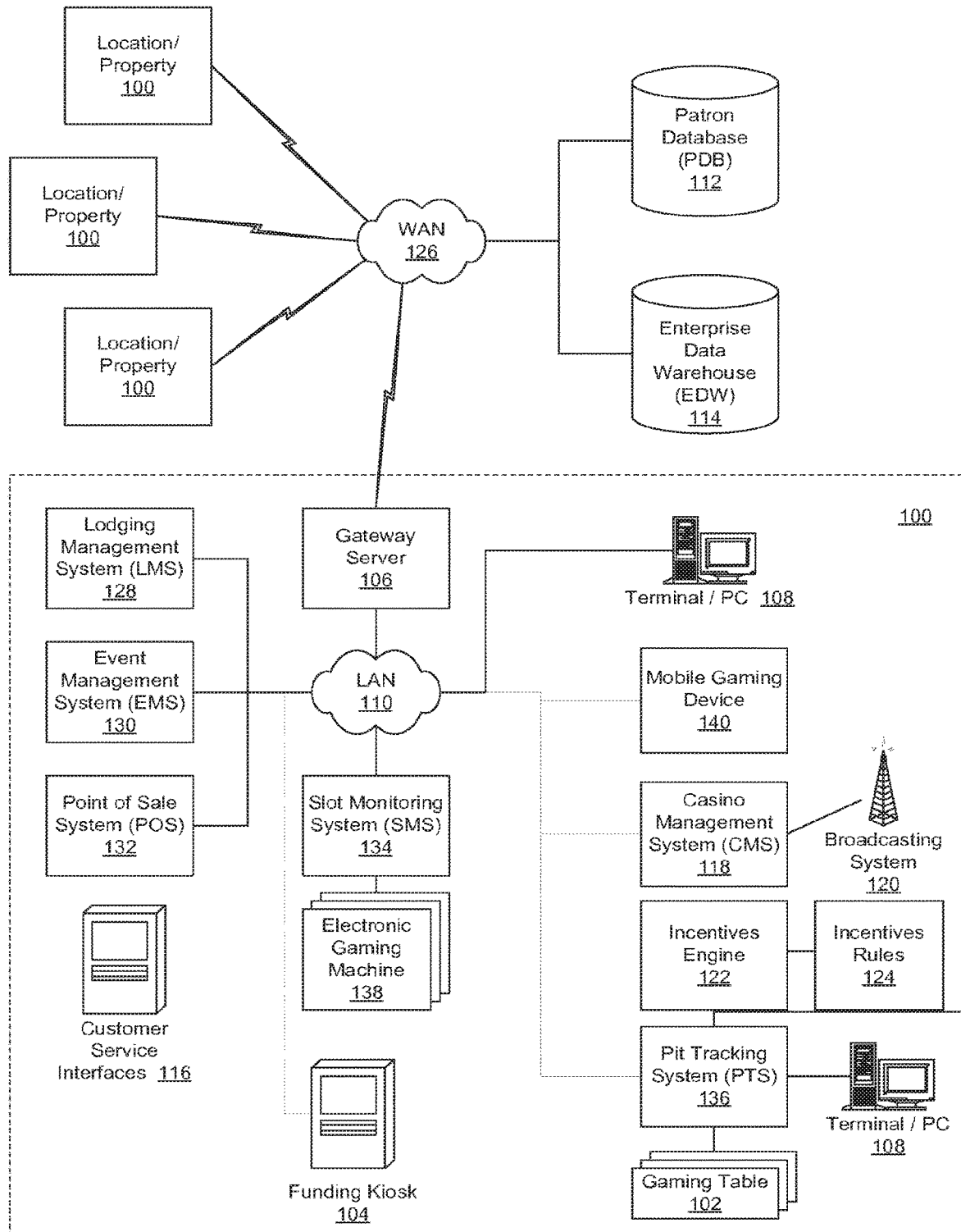
FIG. 1 is a block diagram of the overall architecture of one embodiment.

FIG. 1 illustrates a casino enterprise network for supporting funding and operation of on-site mobile gaming according to one embodiment. The environment of FIG. 1 is suited for a casino or other gaming establishment.

In one embodiment, the casino enterprise network includes a number of casino properties 100, wherein each casino property 100 includes a gateway server 106 for coupling a local network 110 (such as a LAN) at the casino property 100 to a wide area network (WAN) 126. This allows multiple properties 100 to share and exchange data. In addition, the property 100 preferably includes one or more local operator terminals 108 (such as a PC) coupled to the LAN 110, allowing casino personnel to access the system from the property 100. Having an operator terminal 108 at each property 100 allows local casino employees to manage the casino management system 118 at the property level, in real-time, and in response to player or casino needs.

In one embodiment, the gateway server 106 includes an API for sending data pertaining to local player activity over the WAN 126 to other properties or to a central data warehouse, such as the enterprise data warehouse (EDW) 114 and a patron database (PDS) 112.

The gateway server 106 communicates with several computer systems for monitoring and tracking operations at the particular property 100.

The PDS 112 provides the system with data regarding individual patrons, or patrons in a casino context. The PDS 112 preferably includes patron accounts (i.e., casino accounts, including casino reward programs) for patrons from all of the casino properties 100. The PDS 112 can be a centralized database or a distributed or federated database with segments of the database located at the casino properties 100. In one embodiment, each patron account in the PDS 112 includes detailed information such as the patron's personal information, preferences, interests, gaming and lodging history, credit rating, comp level, customer value measures, and accumulated credits. A patron's customer value is a measure of the patron's value to the casino based on the patron's betting activity, and optionally based on other activities of the patron from which the casino derives revenue or value. In one embodiment, the customer value measure is a theoretical win value is determined according to the patron's betting activity accumulated at any of the properties affiliated with the enterprise. Credits may be determined according to patron betting activity, but they may also be augmented by other types of activities as well and by special offers and various other promotional programs. These other activities include but are not limited to making a reservation, staying in a hotel, purchasing an item in a retail environment, eating at a restaurant, and attending a show or other events. In another aspect of an embodiment, PDS 112 is coupled via the WAN 126 to the EDW 114 uploading patron activity information for further analysis.

Figure 4:
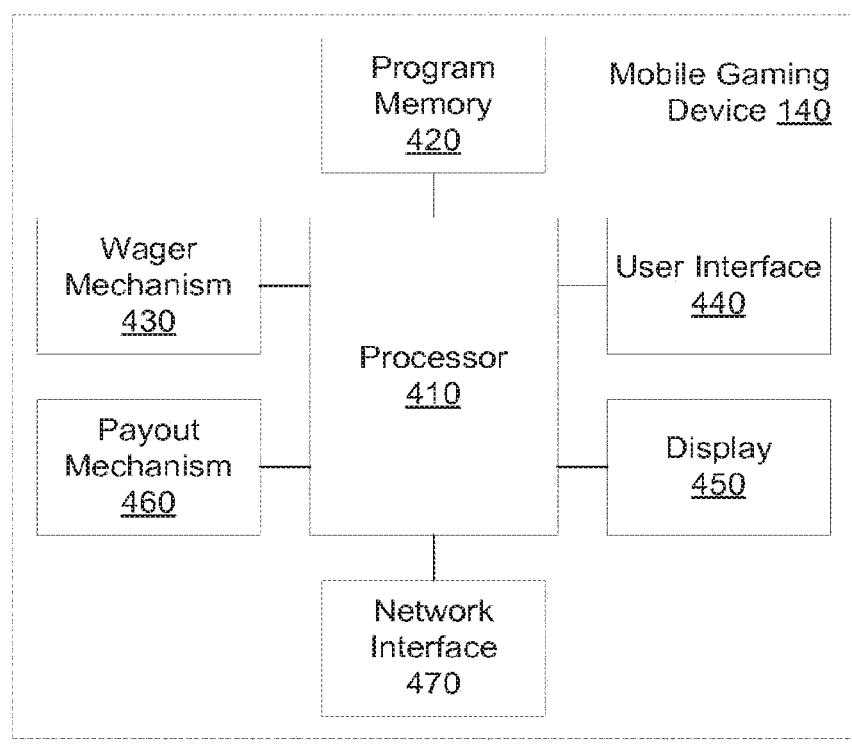
FIG. 4 is a block diagram showing features of a mobile gaming device in accordance with one embodiment.

In one embodiment, patrons are issued tracking cards to interface with the system and thereby allow for tracking of their activities and identification of the patrons at locations in the casino such as mobile device 140, further described in FIG. 4. Each tracking card preferably includes a magnetic strip, microchip, or other mechanism for storing machine-readable data thereon. When a patron performs some activity at a property, the patron may use the tracking card to interface with the system. For example, in the case of magnetic strip cards, the patron inserts the card through into card reader (i.e., "card-in"). Specifically, for tracking patron betting, a slot machine or other gaming machine 138 includes a magnetic stripe card reader (not shown), which is adapted to receive the patron tracking cards. The incorporation of card readers into gaming machines 138 is a standard practice and well known to those of skill in the art. In an alternate or additional method of tracking patron activity, the patron or enterprise personnel can manually enter a patron ID number into a terminal 108 coupled to the system.

Depending on the services offered at a property 100, any combination of the following systems might be used to gather patron activity data: a Casino Management System (CMS) 118, a Lodging Management System (LMS) 128, an Event Management System (EMS) 130, a Point of Sale System (POS) 132, a Slot Monitoring System (SMS) 134, and a Pit Tracking System (PTS) 136.

The CMS 118 is responsible for overall management of the tracking of patron activity, and the determination of reward credits to be given to each patron based on such activity. The CMS 118 receives data describing a patron's activity from the various other systems, as further described below, makes the appropriate calculations for earned reward credits, and updates the patron's account in the PDS 112.

The SMS 134 comprises a computer system that monitors and tracks bets made by patrons at the various gaming machines 138 at the property 100. Gaming machines 138 may include a video poker machine or any other electronic gaming machine that is able to host the disclosed blackjack game. In one embodiment, bet tracking is accomplished through a card reader associated with a gaming machine 138. A patron inserts his tracking card in the card reader to initiate bet tracking and removes it to terminate bet tracking. Preferably, a patron's betting activity at a gaming machine 138 is logged in real time in the SMS 134 so that the information is provided to the CMS 118 before the gaming session is terminated. Set tracking data accumulated by the SMS 134 includes the identification of the games played, the amount of coin-in, the number of credits won, the number of credits played, the amount won or lost, and the time period that the patron played the game. U.S. Pat. No. 5,429,361, the contents of which are fully incorporated by reference herein, describes a system for tracking the betting activity of casino patrons at gaming machines. In one embodiment, the SMS 134 includes the SDS, a data collection system for slot accounting and patron tracking produced by Bally Technologies, Inc.

In one embodiment, SMS 134 additionally includes a mobile gaming server component (not shown), which receives funding information from funding kiosk 104 including a wagering amount and validation code, and provides funding authorization responses to mobile gaming device 140 as described below.

In one embodiment, the CMS 118 includes or is coupled to a broadcasting system 120, such as an 802.11 transmitter, that enables a secure, wireless environment. In this way, offers can be delivered to patrons over a wireless LAN to properly equipped wireless devices held by the patrons, as described above.

The PTS 136 is used to track patron betting at gaming tables 102 or gaming machines 138. The PTS 136 is supported on a computer system that transmits patron betting data to the CMS 140. In one embodiment, the PTS 136 uses card readers associated with patrons' positions at the gaming tables 102 to track their betting activity. Alternatively, an employee of the enterprise, such as a pit boss, manually enters a patron's gaming data into the PTS 136. In one embodiment, data regarding betting activity include a patron's time at a gaming table 102 and the table's minimum bet. U.S. Pat. No. 5,613,912, the contents of which are fully incorporated by reference herein, describes a system for automatically tracking the betting activity of casino patrons at gaming tables. Alternatively, tracking of patron betting at gaming tables is provided via a terminal 108 located in the pit near the tables. A patron provides her patron tracking card to a casino employee (e.g., a pit boss) who swipes the tracking card through a card reader at the terminal 108 to initiate the patron's session. The employee can then observe the patron's betting, and manually enter this information into the terminal 108, such as average amount bet, length of play, and so forth.

The LMS 128 comprises the software and hardware for managing hotel operations within the casino, including reservations, room service, and other activities associated with hotel operations. In one embodiment, the LMS 128 communicates with the CMS 118 to search locally for selected customer information available on that system. However, LMS 128 may include its own local data store for patron data specific to the property 100. The LMS 128 transmits data regarding patrons' lodging activity to the PDS 110 when patrons check in and out of a hotel. In an embodiment, a patron's lodging data includes the dates that the patron stayed at a particular property and the type of rooms. This data may also be updated to a central PDS via an application server. In addition, the LMS 128 preferably transmits lodging data upon a request from the application server (via the local gateway server 106). The lodging data includes, for example, the dates that a patron stays at a hotel, room service activity, and billing information due to the patron's stay in the hotel.

The EMS 130 comprises software for handling ticketing information, reservations, and sales. The EMS 130 compiles patron activity data when patrons purchase tickets for an event (such as a show at the property), make reservations for an event, and attend the event. The EMS 130 transmits this data to the application server upon request (via the local gateway server 106).

The POS 132 comprises accounting software for operating restaurants and retail venues within the property as well as software for transmitting charge information to the other management systems. For example, data relating to meals charged to rooms are transmitted from the POS 132 to the LMS 128, and data relating to redeemed meal comps are transmitted from the POS 132 to the CMS 118. The gateway server 106 receives data relating to patron's purchases at a property from the POS 132 and transmits the data to the application server. This purchasing data includes, in an embodiment, the items or services purchased, the restaurant or retail venue where purchased, and the purchase amounts.

The property 100 preferably includes one or more customer service interfaces (CSI) 116. In one embodiment, a customer service interface 116 comprises a computer having an output display and a user input, such as a card reader and a touch screen. Patrons can access information for their account with a customer service interface 116, e.g., by swiping their cards through the card reader. The customer service interface 116 may be housed in a kiosk or other user accessible housing. In one embodiment, the CSI 116 receives patron data by way of their tracking cards swiped at customer service interfaces 116 located at various venues throughout the property 100. The CSI 116 transmits the received data to the PDB 110 to determine the identity of the patron and any required data in the patron's account (such as name, address, and any preferred customer status). In particular, the CSI 116 enables customers to view the reward credit balance, and to issue themselves redeemable "comp" tickets or cash voucher according to a provided menu of comps and their associated number of credits.

Data related to each patron's activity at a property 100, as collected by any of the management systems described herein, are communicated to the CMS 118, for analysis and determination of appropriate reward credits. The CMS 118 updates the PDB 112 with the results of such analyses, including updating a patron's account by incrementing (or decrementing) the patron's reward credit balance. Because each property 100 tracks patron betting activity, awards reward credits and/or other incentives based on such activity, and updates the PDB 112, the enterprise can reward patrons based on their overall betting (and other activity) at all of the casino properties. This cross-property nature of the system, in combination with the fixed and variable credit rate schedules, enables the enterprise to adjust the difficulty of a casino game based on their overall worth to the enterprise and/or from their overall betting activity, while also allowing individual properties 100 to reward the patron based on property-specific factors or rules. To maintain all account data up to date, the data processed by the local management systems are periodically updated to central PDS 112, e.g., in a batch process. In one embodiment, this update synchronizes data between multiple storage properties (i.e., PDS 112 and local stores associated with the CMS 118 at each property 100) to enable enterprise personnel at any property 100 to access the most recent and accurate data. When this configuration is employed with a WAN 126 having limited bandwidth, the data synchronization is preferably done when traffic on WAN 126 is low to minimize interference with other on-line data access transmissions.

The CMS 118 is responsible for receiving patron betting data from the SMS 134 and the PTS 136 and updating the PDS 112 with this information.

Casino property 100 in various embodiments makes available one or more mobile gaming devices 140 to patrons. Mobile gaming devices 140 may be electronic tablets (such as, for example, those that run the Apple iOS or Google Android operating systems), smartphones, laptop computers, or other hardware computing devices designed to execute code stored on a computer-readable medium that enables playing of one or more games that require a wager. Mobile gaming device 140 also executes software that enables funding of games on the device 140 as described further below. In some embodiments, mobile device 140 belongs to the patron, who brings it to the casino. In alternative embodiments, mobile device 140 is provided to the patron by the casino for the patron's use while on the property. The mobile device 140 in one embodiment is tethered to a physical object at the casino 100, such as a lounge chair or other object that prevents the mobile device 140 from being removed from the casino property.

Casino property 100 also includes one or more funding kiosks 104. Kiosks 104 receive money (e.g., cash, credit card information, or other forms of payment) from a patron, and through communication with the gaming system of SMS 134 and other casino systems enable the received money to be made available to mobile gaming devices 140 to fund wagering by the patron on those devices 140. This functionality is further described below.

Figure 2:
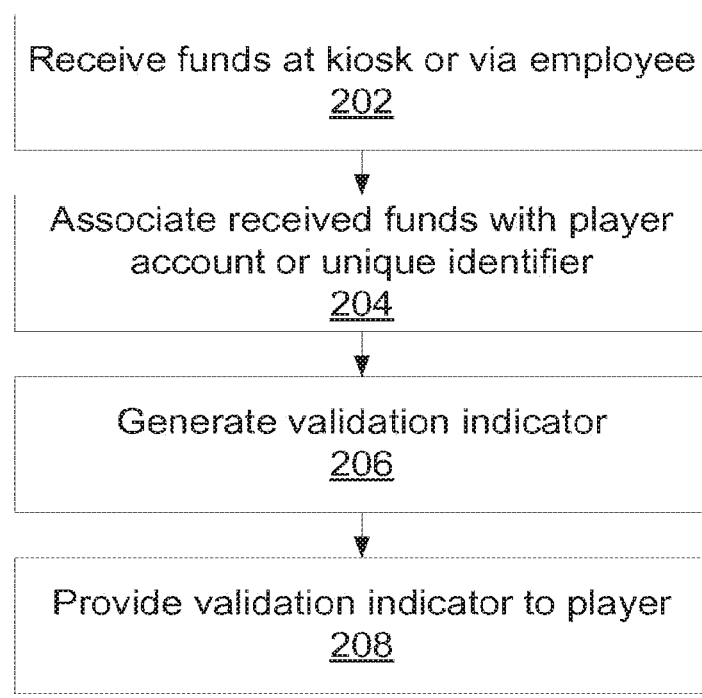
FIG. 2 is a flowchart illustrating a method for receiving funding for an on-site mobile gaming device according to one embodiment.

FIG. 2 illustrates a process by which a patron provides funding for in-casino mobile gaming in accordance with one embodiment. As noted, casino property 100 includes one or more funding kiosks 104. Funding kiosks 104 are devices adapted to receive money from a casino patron. Money may include cash, for example using a bill validator, or other forms of payment such as a credit card. In some embodiments, funding kiosk 104 additionally includes a mechanism for identifying the patron. For example, kiosk 42 may include a card reader capable of reading a player tracking card to identify the patron. Alternatively, or if the patron does not have a player tracking card, the kiosk 104 is capable of receiving input, e.g., at a touch screen or keyboard, that allows the patron to identify herself using indicia such as name, player tracking number, unique code number, or the like. Upon receiving 202 funds from the patron, kiosk 104 determines the amount of the funds provided by the patron and associates 204 the received funds with the patron's account, if it is known, or with a unique code number in the alternative. Funding kiosk 104 then generates 206 a validation indicator code and transmits the identifying information including player indicia or unique code and a validation code to the gaming module of SMS 134.

Funding kiosk 104 in one embodiment issues 208 a printed ticket to the player. The printed ticket includes validation information such as an alphanumeric code or barcode that associated with the funding transmission. In one embodiment, as described above, kiosk 104 generates the validation code and provides it to the gaming module of SMS 134. In an alternative embodiment, kiosk 104 receives the validation information from SMS 134 once the funding is associated 204 with the patron's account. As an alternative to printing a paper ticket for the patron, funding kiosk 104 alternatively transmits validation information to the patron via text message or e-mail.

In alternative embodiments, a patron can provide cash or other forms of payment to a casino employee, who can then enter the patron information and funding amount into a workstation computer that also communicates with SMS 134 to perform the association described above, and that can print a ticket with validation information or, alternatively, provide the validation information to the patron directly as described above via text or e-mail.

In another embodiment, funding kiosk 104 is a workstation computer accessed directly by the patron and offers the functionality described above, but lacks a bill validator as a payment option.

Figure 3:
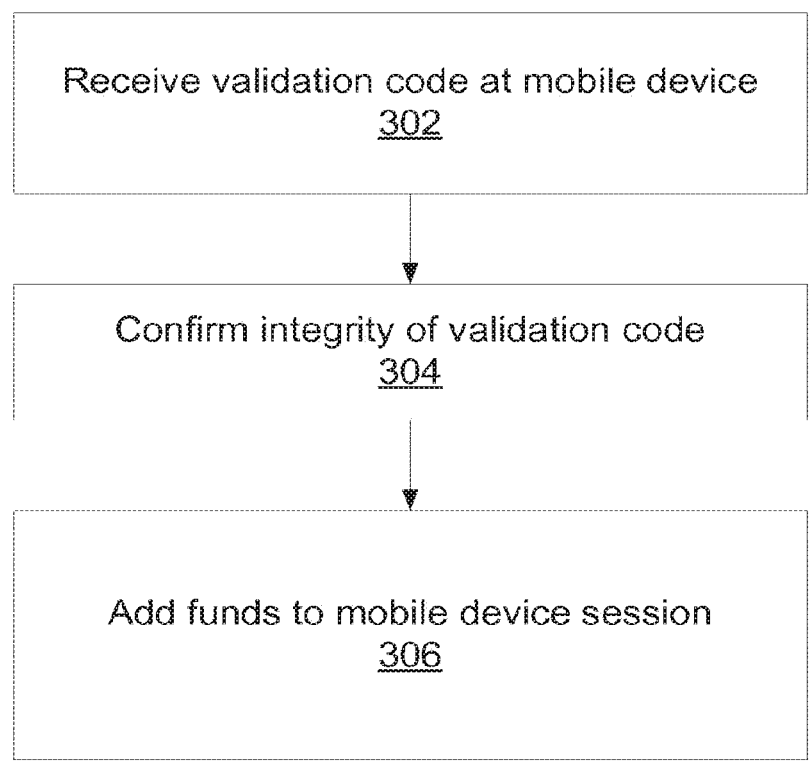
FIG. 3 is a flowchart illustrating a method for applying funding to an on-site mobile gaming device according to one embodiment.

Once the patron has received a validation code, either via a paper ticket, by e-mail, or by text message, she is able to use the validation code to fund wagering activity on mobile device 140. Referring now to FIG. 3, which illustrates a method for adding funds to a mobile device for a wagering session, mobile device 140 receives a validation code from the patron via a user interface of the mobile device 140. In one embodiment, a processor of mobile device 140 executes software stored on a computer-readable medium, and the software acts as a client application for receiving the validation code. The client software then establishes a communication with the gaming module of SMS 134, for example by communicating wirelessly via LAN 110 with SMS 134. The client software provides SMS 134 with identification information about the patron, such as a patron affinity tracking number, name, unique code, or other indicia, as well as the validation code. Alternatively, the client software provides only the validation code. SMS 134 confirms that the validation code is authentic, or alternatively, is valid for that patron, and transmits the authorization to mobile device 140, which receives 304 the confirmation. Mobile device 140 then adds 306 the authorized amount of funds to a credit meter used by wagering games executed by mobile device 140. In various embodiment, the patron provides the validation code to the client software by manually keying it, or by using a scanning application or camera on the mobile device 140 (not shown) to capture the validation code or barcode.

In one embodiment, mobile device 140 additionally includes a GPS or other location-reporting tool that provides a current location of the mobile device 140 to SMS 134 as part of the validation request. In this embodiment, SMS 134 confirms that the reported location of the mobile device 140 is within an authorized area in which wagering can be funded. If the mobile device 140 does not report its location as within such an authorized area, SMS 134 reports a failure to device 140, and no funding takes place on that mobile device 140. Alternatively, SMS 134 may provide, as part of the validation confirmation, parameters defining an authorized area in which wagering can take place, and mobile device 140 disables any wagering activity when its location-reporting tool detects that its location is not within the authorized area.

In an additional embodiment, wagering at table games 102 within the casino 100 can also be funded using a funding kiosk 104. In this embodiment, the table game 102 includes a terminal accessible to the patron at which the validation information can be provided. Once validated by SMS 134, the banker at the table game 102 is instructed, e.g., via terminal 108, to provide the authorized amount of chips to the patron for wagering.

Upon completion of the wagering session on the mobile device 140 or turning in of the patron's chips at table game 102, the mobile device 140 client software, or operator of table game terminal 108, as the case may be, provides the updated available funds to SMS 134, which then increments or decrements the patron's available credit accordingly, and the mobile device 140 sets its credit meter to zero. The patron may then return to funding kiosk 104 and enter or scan her validation code, and cash out some or all of the credits available.

In various embodiments, if the patron wishes to supplement the wagering amount available on mobile device 140, she can return to the funding kiosk 104 and repeat the process described above. In one embodiment, the patron enters or scans the original validation code when returning to the funding kiosk 104, and once funding is complete, the validation code an again be used at the mobile device 140 to increase the credit available on the device. In an alternative embodiment, the patron simply repeats the process at funding kiosk 104 and obtains a new validation code.

FIG. 4 illustrates a block diagram of a mobile gaming device 140 configured to provide in-casino mobile gaming, according to one example embodiment. One or more users may place wagers and play games on the mobile gaming device 140. As described, the components of the mobile gaming device 140 may be implemented as hardware components, or has a combination of software and hardware.

The mobile gaming device 140 includes a processor 410, a program memory 420, a wager mechanism 430, a user interface 440, a display 450, a payout mechanism 460, and a network interface 470. The processor 410, which may comprise one or more individual processors, receives and processes instructions for the wagering games played on the device 140. Furthermore, the processor 410 outputs and receives signals to and from the wager mechanism 430, user interface 440, display 450, payout mechanism 460, and network interface 470. The processor 410 may be embodied as a microprocessor or an application-specific integrated circuit (ASIC).

The program memory 420 stores a set of instructions for playing the wagering games on the mobile gaming device 140, using any of the embodiments previously described. Instructions from the program memory 420 are received and executed by the processor 410, operating in accordance with the methods disclosed. The program memory 420 may be a storage device including a combination of volatile memory (e.g., RAM) and non-volatile memory (e.g., a hard disk, flash memory, or removable storage medium).

The wager mechanism 430 receives funding information from the SMS 134 upon successful validation code entry, as described above, and enables a patron to make a wager on the device 140. The wager mechanism 430 detects when a wager has been received from a user of the mobile gaming device 140.

The user interface 440 allows the user to input commands to the mobile gaming device 140, as well as the validation code described above for funding wagering. The user interface 440 may be one or more softkey buttons, switches, levers, keyboards, joysticks, touchscreens, or any other apparent interface device. Furthermore, the user interface 440 may be a combination of the aforementioned interface devices. Each element of the user interface 440 may have a different function. In one embodiment, all user interaction with the mobile gaming device 140 is performed through a touchscreen. Based on user interaction with the user interface 440, the user interface 440 sends signals to the processor 410.

The display 450 outputs game information to the user. The display 450 receives signals from the processor 410 and displays information based on the received signals. The display 450 may convey to the user information not directly related to the game, such as player profile information, customer service information, or other relevant information. The display 450 may be in the form of speakers, lights, screens, analog displays, or a combination of displays. Furthermore, some aspects of the display 450 may be combined with aspects of the user interface 440. In one example mobile gaming device 140, the display 450 and user interface 440 are embodied as a single touchscreen.

The payment mechanism 460 communicates with SMS 134 via network interface 470 upon termination of a gaming session.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for funding wagering on a mobile device, the method comprising:
   receiving, at a gaming kiosk located at a casino property, funding for a wagering game, the funding having an amount;
   generating, by the gaming kiosk, a first validation code;
   issuing, by the gaming kiosk, the first validation code to a patron, wherein the first validation code is issued by text message;
   transmitting, by the gaming kiosk to a gaming module, information describing the funding amount and the first validation code;
   receiving, by the gaming module, the information describing the funding amount and the first validation code;
   receiving, by the gaming module, a request from a mobile device for funding of a wagering game on the mobile device, the request including a second validation code;
   responsive to the first validation code matching the second validation code, authorizing the mobile device to be funded in the amount of the funding for the wagering game.

2. The method of claim 1 wherein the request from the mobile device for funding of the wagering game includes a location of the mobile device, and further comprising:
   determining, by the gaming module, whether the received location of the mobile device is within an authorized location; and
   wherein authorizing the mobile device to be funded in the amount of the funding for the wagering game is further responsive to a determination that the mobile device is within the authorized location.

3. A system for funding wagering on a mobile device, the system comprising:
   a gaming kiosk located at a casino property and including a first processor, the first processor adapted to:
   receive funding for a wagering game, the funding having an amount;
   generate a first validation code;
   issue the first validation code to a patron, wherein the first validation code is issued by text message; and
   transmit information describing the funding amount and the first validation code to a gaming module;
   a gaming module, communicatively coupled to the gaming kiosk and including a second processor, the second processor adapted to:
   receive the information describing the funding amount and the first validation code;
   receive a request from a mobile device for funding of a wagering game on the mobile device, the request including a second validation code; and
   responsive to the first validation code matching the second validation code, to authorize the mobile device to be funded in the amount of the funding for the wagering game.

4. The system of claim 3 wherein the request from the mobile device for funding of the wagering game includes a location of the mobile device, and wherein the second processor is further adapted to:
   determine whether the received location of the mobile device is within an authorized location; and
   wherein the authorizing of the mobile device to be funded in the amount of the funding for the wagering game is further responsive to a determination that the mobile device is within the authorized location.

5. A method for funding wagering at a casino, the method comprising:
   receiving, at a gaming kiosk located at a casino property, funding for a wagering game, the funding having an amount; generating, by the gaming kiosk, a first validation code;
   issuing, by the gaming kiosk, the first validation code to a patron, wherein the first validation code is issued by text message;

transmitting, by the gaming kiosk to a gaming module, information describing the funding amount and the first validation code;

receiving, by the gaming module, the information describing the funding amount and the first validation code;

receiving, by the gaming module, a request from a terminal located at a table game within the casino for funding of a wagering game at the table, the request including a second validation code;

responsive to the first validation code matching the second validation code, authorizing dispensing of gaming chips to a patron associated with the terminal.

* * * * *